Aug. 15, 1961 H. A. GORJANC ET AL 2,996,017
OVERHEAD MONORAIL TRACK SWITCH
Filed May 18, 1959 4 Sheets-Sheet 2
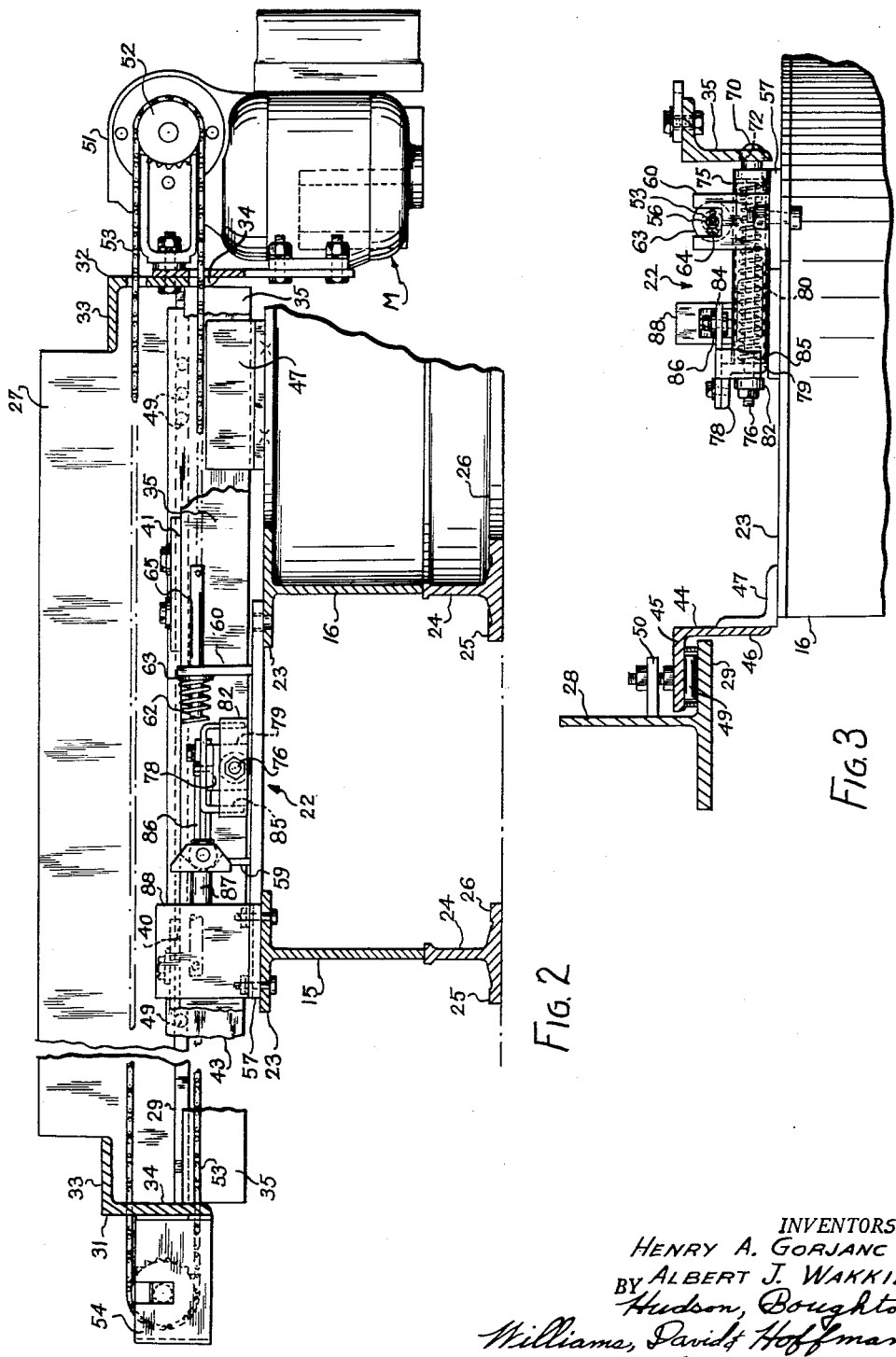
INVENTORS
HENRY A. GORJANC
BY ALBERT J. WAKKILA
Hudson, Boughton,
Williams, Davids Hoffmann
ATTORNEYS Aug. 15, 1961  H. A. GORJANC ET AL  2,996,017
OVERHEAD MONORAIL TRACK SWITCH
Filed May 18, 1959  4 Sheets-Sheet 3

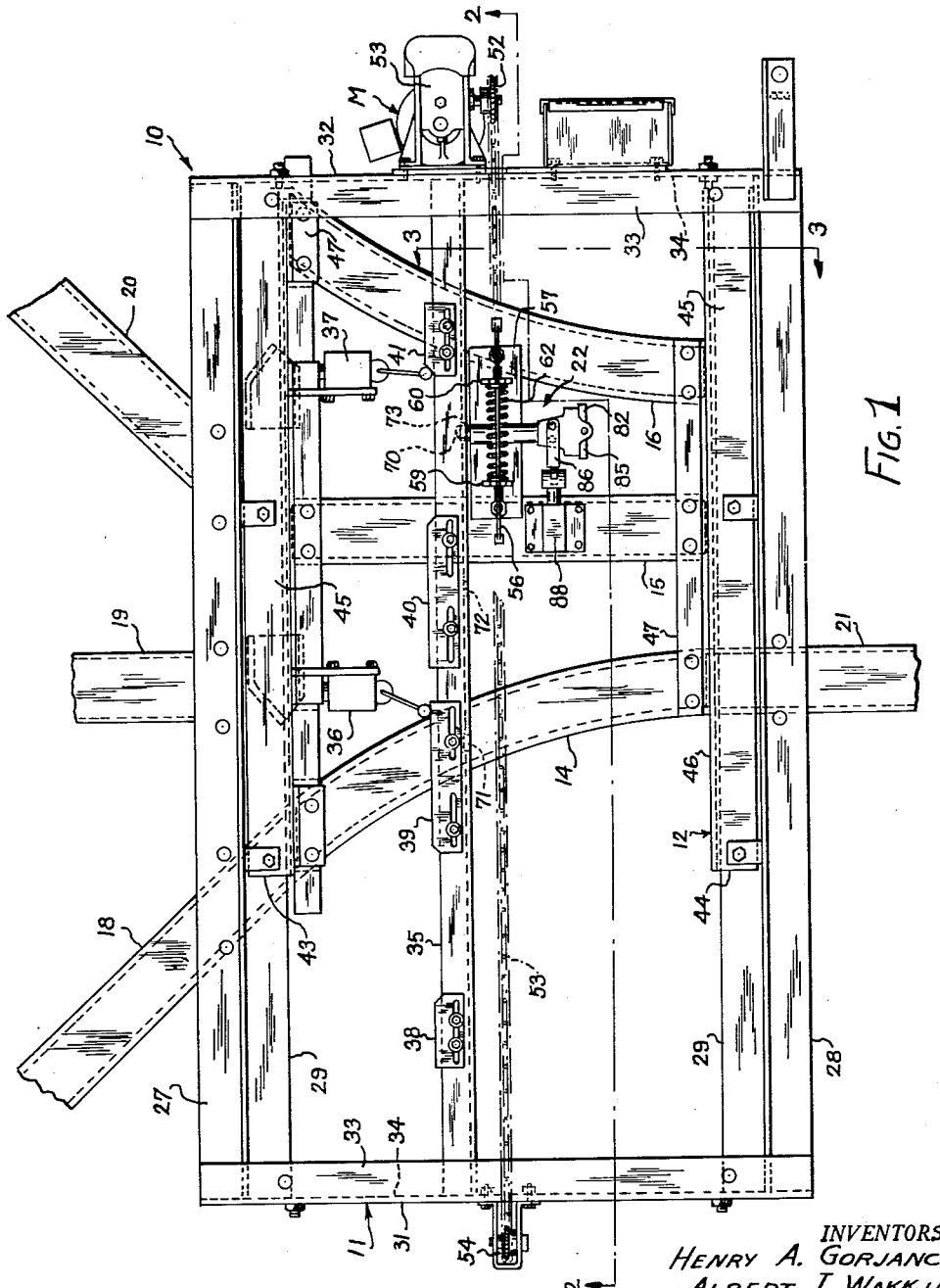

INVENTOR.
HENRY A. GORJANC
BY ALBERT J. WAKKILA
Hudson, Boughton,
Williams, David & Hoffmann
ATTORNEYS INVENTORS
HENRY A. GORJANC
BY ALBERT J. WAKKILA
Hudson, Boughton,
Williams, David Hoffmann
ATTORNEYS

United States Patent Office 2,996,017
Patented Aug. 15, 1961

2,996,017
OVERHEAD MONORAIL TRACK SWITCH
Henry A. Gorjanc, Wickliffe, and Albert J. Wakkila, Fairport Harbor, Ohio, assignors to The Cleveland Crane & Engineering Company, Wickliffe, Ohio, a corporation of Ohio
Filed May 18, 1959, Ser. No. 813,792
8 Claims. (Cl. 104—102)

This invention relates to material handling system of the overhead monorail carrier type, and more particularly to such systems having a motor operated track switch therein for transferring a carrier traveling on the system from one trackway to another.

The invention has as its principal object the provision of an improved overhead monorail system including a track switch shiftable to a plurality of operative positions with respect to trackways associated therewith conducting a carrier from one trackway to another, the switch including latch means for releasably holding the track switch in the desired operative position, and having reversible motor means for shifting the switch from any one of its operative positions to any other of such positions in response to an electric control means.

Another object of this invention is the provision of a novel track switch for use in an overhead monorail track system and having a movable frame which is shiftable with respect to a fixed frame in a transverse direction between an intermediate position and end positions on opposite sides of the intermediate position to selectively position sections of trackway carried thereby between a trackway at one side of the switch and one of three trackways at the other side, the switch having cooperative abutment means and solenoid operated latch means on the frames for releasably holding the movable frame in one of its operative positions, and having reversible electric motor means for shifting the movable frame, there being electric control means to which the solenoid operated latch means and the motor means are responsive to release the movable frame, move it to a new one of its operative positions and secure it therein.

The invention may be further briefly described as residing in certain combinations and arrangements of parts and other advantages thereof will be apparent to those skilled in the art to which it pertains from the following description of the presently preferred embodiment described with reference to the accompanying sheets of drawings forming a part of this specification, and in which:

FIG. 1 is a fragmentary plan view of an overhead monorail system having a track switch embodying the present invention;

FIG. 2 is an enlarged sectional view of a portion of the track switch of FIG. 1 taken along line 2—2 thereof with some portions broken away;

FIG. 3 is an enlarged sectional view of a portion of the track switch of FIG. 1 taken along line 3—3 thereof;

FIG. 7c is a diagrammatic illustration similar to FIG. 7b, but with the track switch moved to the side position opposite to that of FIG. 7a.

Figure 4:
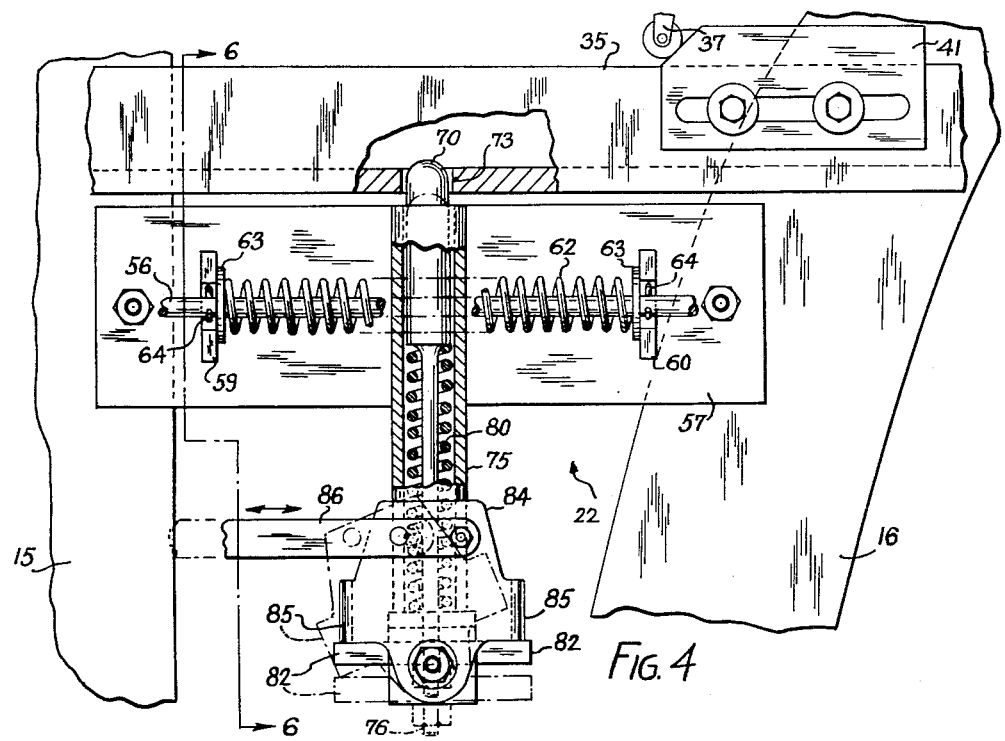
FIG. 4 is a top view of the latch mechanism of FIG. 1 with some parts broken away.
Figure 5:
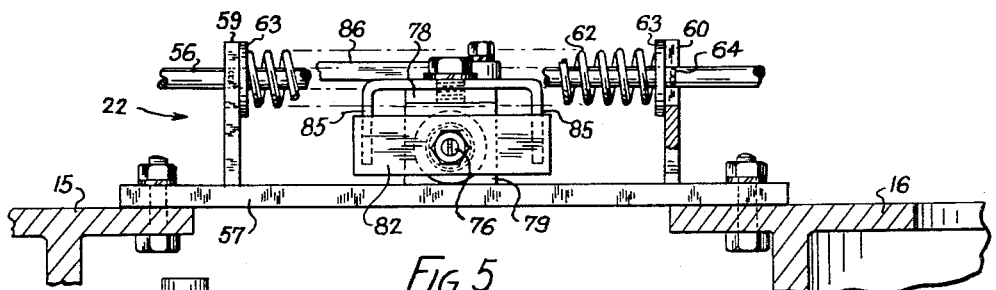
FIG. 5 is an end view of the latch mechanism of FIG. 4.
Figure 6:
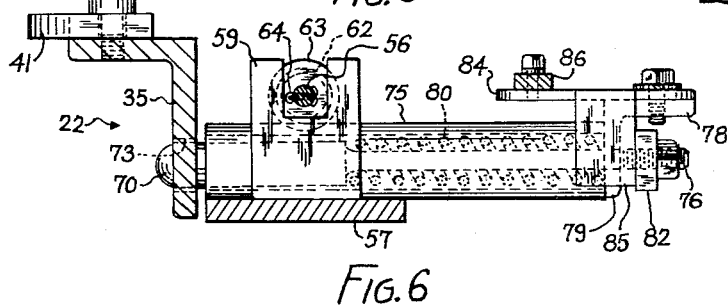
FIG. 6 is an enlarged sectional view approximately on the line 6—6 of FIG. 4.

Although the invention is adaptable to use in either a two way or three way track switch of either the shifting tongue or shifting rail type, it is therein disclosed and described as embodied in a three way switch of the shifting rail type. Referring to the illustrated switch 10 a fixed assembly 11 supports movable frame assembly 12 having three monorail track sections 14, 15 and 16. The movable frame assembly 12 may be shifted to any of three operative positions to determine which one of three trackways 18, 19 and 20 at one side of the track switch is connected with a trackway 21 at the opposite side of the switch. Each of the three operating positions of the movable frame 12 will align one of the rail sections 14, 15 and 16 carried thereby with the trackway 21 and with one of the three trackways 18, 19 and 20, respectively, to provide a continuous path between the trackway 21 at one side of the switch and a selected one of the trackways 18, 19 and 20 at the other side of the switch.

In the illustrated embodiment the rail section 14 of the switch is aligned with the trackway 18 and the trackway 21. The rail section 14 forms a part of the movable frame 12 and is located to the left of the rail section 15, as illustrated in FIG. 1. The rail section 15 is located to the left of rail section 16, and these sections 15 and 16 are for interconnecting the trackway 21 with the trackways 19 and 20, respectively. The trackways 18 and 20 diverge from the switch at angles of approximately 45 degrees, and the rail sections 14 and 16 are curved correspondingly to provide a continuous path for a carrier traveling between the trackway 21 and the selected trackway 18 or 20.

The shifting of the movable section 12 between selected ones of its three operative positions is effected preferably by a reversible electric motor M mounted on the fixed frame 11. The motor M is under the control of a push button control circuit which includes a pair of cam actuated limit switches 36 and 37, which limit switches are mounted on the movable frame 12 and are adapted to be actuated by cam means such as four cam elements 38, 39, 40, and 41 mounted on the fixed frame 11.

When the movable section 12 is occupying one of the three operative positions, it is held from moving therefrom by a solenoid operated latch means, indicated generally at 22. The solenoid actuated latch means 22 and the motor M are energizable by the above mentioned control circuit to release and shift the frame 12 to an operative position other than the one occupied, and the limit switches 36, 37 will, at the proper point in the movement of the frame 12, de-energize the motor M and the solenoid actuated latch means to secure the frame 12 in the selected operative position.

The trackways 18—21 and the rail sections 14, 15, 16 are of conventional monorail construction and will not, therefore, be described in detail. Suffice it to say that each includes a rail member having a web 24 terminating at its lower edge in horizontal flange portions 25, 26 extending from the opposite sides of the web for supporting the wheels of the overhead monorail carrier and at its upper edge in horizontal flange portions 23.

The stationary frame assembly 11 is supported in any conventional manner above the trackways 18—21 and comprises spaced horizontal inverted T-shaped members 27 and 28 extending transversely of the trackways 18—21 and having lower inwardly extending flange portions 29 for slidably supporting the movable frame assembly 12. The members 27 and 28 are connected at their ends by left and right side members 31, 32 having inwardly directed flange portions 33 and downwardly directed flange portions 34. In addition, the outer frame 11 comprises a transverse angle member 35 extending between and welded to the side members 31, 32 midway between the members 27 and 28. The angle member 35 serves as a latch abutment means and as a support for the limit switch operating cam means 37, 38, 39, and 40, later to be described in detail.

The inner frame assembly, including the rail sections 14, 15, and 16, comprises L-shaped or angle members 43 and 44 parallel and adjacent to the T-shaped members 27, 28, respectively, and each having a horizontal portion 45 overlying the adjacent flange portion 29 of the T-shaped members 27, 28 and a depending vertical leg portion 46 having an angle member 47 secured thereto as by welding and itself welded, riveted, or otherwise secured to the upper flange portions 23 of the rail sections 14, 15, and 16. Any suitable antifriction means such as roller bearings 49 may be interposed between the horizontal portions 45 of the members 43, 44 and the adjacent horizontal flange portions 29 of the T-shaped members 27, 28 to support the movable frame assembly 12 on the stationary frame assembly 11 and facilitate the shifting of the movable frame assembly. Lifting or raising of the movable assembly 12 away from the rollers 49 is limited by adjustable stops carried by members 50 welded to the vertical flanges of the members 27, 28.

The reversible motor M is preferably electric and may be a D.C. motor or a single or polyphase A.C. motor, a single phase motor being shown and described herein. A gear reduction means 51 is conveniently provided on the motor M, and rotates a sprocket 52 in driving engagement with a flexible transmission means in the form of a chain 53 which leads around an idler sprocket 54 suitably supported on the frame member 31 through which the chain passes in openings provided therefor.

The ends of the chain 53 are connected to opposite ends of a rod 56 forming part of a resilient or shock absorbing connection to the movable frame 12. A base plate 57 is suitably supported across the rail sections 15 and 16 and serves as a support for the hereafter described shock absorbing connection and for the latch means 22, and has also a pair of bifurcated upright members 59 and 60 extending therefrom.

A coil compression spring 62 surrounds the rod 56 and is confined between the upright members 59 and 60 and between end washers 63. A cotter pin 64 or the like passes through the rod 56 outside of each end washer 63 and is adapted to pass through the bifurcation in each of the upright members 59, 60. It will be apparent that the movement of the chain in a sense to shift the movable frame 12 in either direction will cause the rod 56 to shift compressing the spring 62 between a cotter pin held washer 63 and one of the upright members 59, 60 until the frame begins to move.

The latch means 22, which is supported also by the plate 57, comprises a spring loaded or biased retractable plunger 70 which is adapted to be received in openings 71, 72, and 73 in an abutment means in the form of the angle or frame member 35, and serves to secure the movable frame 12 in any of its operative positions. The plunger 70 is reciprocably carried in a tube 75 and has an extension 76 terminating in a threaded end. The tube 75 has secured at one end an angle member 78, a depending leg 79 of which confines a compression spring 80 in the tube which biases or urges the plunger 70 into engagement with the abutment member 35. A cross plate or bar 82 lying adjacent the angle leg 79 has an opening receiving the extension 76 of the plunger 70, and the extension has a retaining and adjusting nut thereon. The spring 80 acts to extend the plunger 70 and normally draws the cross bar 82 toward the leg 79 of the angle member 78.

An operating lever 84 is pivotally secured to the angle member 78 and has depending side ears 85 in engagement with the cross bar 82. The lever 84 is connected by a link 86 to the armature 87 of an actuating solenoid 88. When the solenoid is energized, upon pressing of a pushbutton or control switch 90, 91, 92 of the control circuit (FIG. 8) the armature pulls in, rocking the lever 84 and camming one of its ears 85 against the cross bar 82, thereby retracting the plunger 70 against the action of the spring 80 and releasing the frame 12 for shifting movement.

Figure 7A:
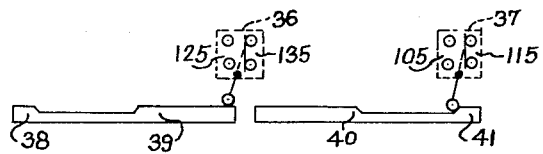
FIG. 7a is a diagrammatic illustration showing the relative positions of the cam and limit switch means when the track switch is in the position illustrated in FIG. 1.
Figure 7B:
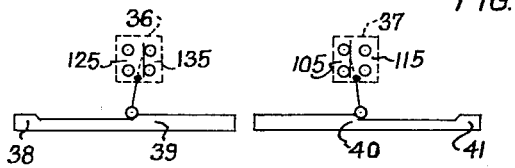
FIG. 7b is a diagrammatic illustration similar to FIG. 7a but showing the relative positions of the cam and limit switch means when the track switch has moved to the center position.
Figure 7C:
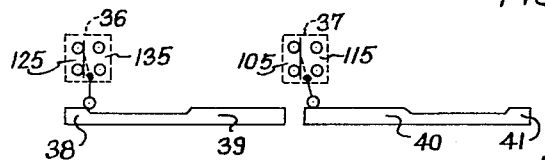
Figure 8:
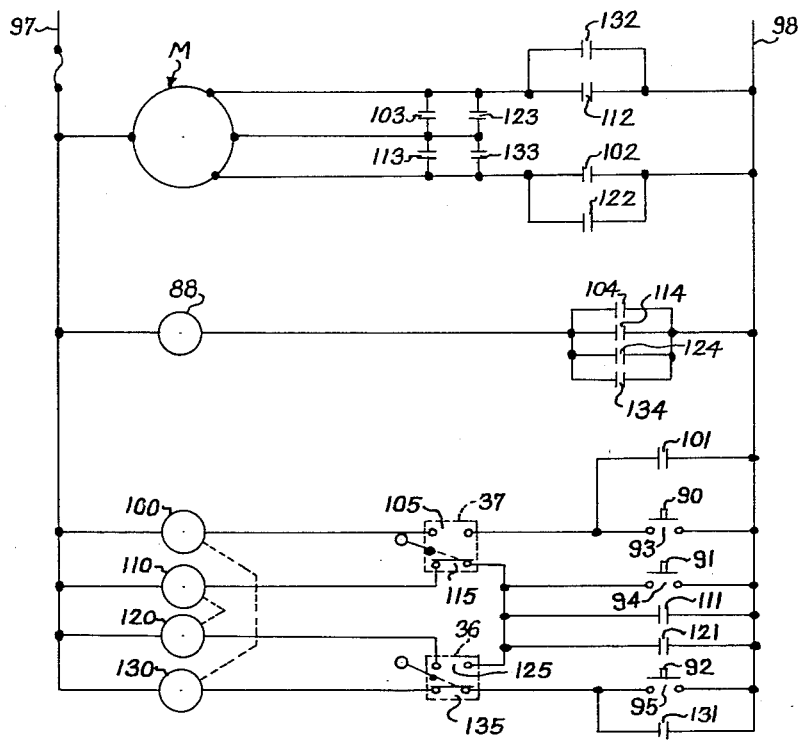
FIG. 8 is a schematic diagram of the motor and latch control circuit.

Referring now to the illustrations of FIGS. 7a, 7b, 7c, and 8, the operation of the track switch 10 and its control circuit will be described. FIG. 7a and 8 show the limit switches 36 and 37 in the positions they would occupy with the movable frame 12 in its right hand position as illustrated in FIG. 1, and as a result of the button 90 having been pushed.

Assuming the movable assembly 12 of the track switch is to be shifted to its center operative position, the pushbutton or control switch 91 is depressed closing the contacts 94 completing a circuit between the power lines 97 and 98 through a control relay 110 having holding contacts 111, motor operating contacts 112, 113 and solenoid energizing contacts 114, and through the already closed contacts 115, of the limit switch 37. The holding contacts 111 will maintain the relay 110 energized, as well as the solenoid 88 and the motor M, running in a direction to shift the frame 12 to the left, until the limit switch 37 engages, and is actuated by, the cam 40 opening the contacts 115, closing the contacts 105, and de-energizing the relay 110, thereby opening the relay contacts 111—114 to de-energize the motor M and the latch operating solenoid 88.

The limit switch 37 is actuated by the cam 40 just as the frame 12 is moving into the center operative position, thereby releasing the latch means 22 and stopping the motor M. The frame 12, however, due to the resilient connection through the spring 62, will coast sufficiently to assure that the spring biased plunger 70 engages in the opening 72 of the abutment member 35.

Upon next pressing the pushbutton 92, closing the contacts 95, a circuit between the power lines 97 and 98 will be established through control relay 130 having holding contacts 131, motor operating contacts 132, 133, and solenoid operating contacts 134, the limit switch 36 already having its contacts 135 closed. As the track switch 10 moves into the extreme left of its operative positions, the moving limit switch 36 will engage, and be actuated by, the cam 38, thereby opening the contacts 135 and closing contacts 125.

The opening of contacts 135 will de-energize the relay 130, opening the motor operating contacts 132, 133 and solenoid operating contacts 134, thereby latching the frame 12 of switch 10 in its left hand position and aligning the trackway 21 with the trackway 20 through the track section 16.

It will observed that with the frame 12 in its left hand operative position the limit switches 36 and 37 will be as shown in FIG. 4c, ready for actuation of the frame 12 to the right by the pushing of either the center button 91 or the button 90. It will be observed also that the frame 12 will be moved to any of the operative positions which it is not at the time occupying without stopping at any other or intermediate position. Thus, if pushbutton or control switch 90 is depressed closing contacts 93 when the track switch is in the FIG. 7c condition with contacts 105 of limit switch 37 closed, the control relay 100 will be energized, closing its holding contacts 101, motor contacts 102, 103, and solenoid contacts 104, thereby moving the frame 12 to the right. The frame 12 will be so moved, through the center position, until the limit switch contacts 105 are opened by engagement of the cam 41.

The relay 120 is actuable in a similar manner by control contacts 94 of pushbutton 91 when the contacts 125 of the limit switch 36 are closed, thereby closing the relay contacts 121—124 until the limit switch 36 engages the cam 39 stopping the switch at its center position.

While the limit switches 36, 37 have been shown and described as being on the movable frame assembly 12 and the switch operating cams 38—41 on the fixed frame 11, their cooperation is through relative movement and their positions can be reversed with no change in operation of the switch 10. Also, the latch means 22 and the abutment means 35 may have their relative positions reversed without affecting the switch operation, and the latch plunger 70 may be retracted by directly acting solenoid means rather than through the camming action heretofore described. In the preferred embodiment of the invention shown the operation of the track switch is initiated by manual operation of push button switches 90, 91 and 92. It is, however, to be understood that these switches may be replaced by suitable switches located along one or more of the trackways so as to be selectively operated by trips on carriers movable about the system.

It can now be seen that the objects and advantages heretofore enumerated, as well as others, have been accomplished and that the present invention provides a new and improved overhead monorail system having in combination therewith a novel track switch for dispatching or conducting a carrier over a selected one of a plurality of trackways exiting from the switch, and that in the event there are more than two positions the track switch can be readily shifted through the use of the described control circuit and associated mechanisms through an intermediate position without stopping therein.

While the invention has been described in considerable detail and with reference to a specific embodiment thereof, it is understood that the invention is not limited to the constructions shown, but rather includes such changes, adaptations and modifications as are reasonably embraced by the scope of the appended claims.

Having thus described our invention, we claim:

1. In an overhead monorail carrier system, a track switch having a first frame, a second frame supporting said first frame for horizontal movement transversely of a trackway at one side of the switch to any of a plurality of operative positions for selectively connecting said trackway with different ones of a plurality of trackways at the other side of the switch, latch means including a movable latch member supported by one of said frames, abutment means on the other of said frames and releasably engageable by said latch member to prevent movement of said first frame when in said operative positions, said latch means including biasing means urging said latch mamber into abutment engaging position, reversible motor means mounted on one of said frames and adapted to move said first frame between said operative positions, solenoid means connected to said latch means and adapted to disengage said latch means when energized, limit switch means on one of said frames and limit switch operating cam means on the other side of said frames, and control switch means including a control switch corresponding to each of said operative positions, said control switch means having electrical connection with said limit switch means and with said solenoid means and with said motor means, the closing of a control switch corresponding to one of said operative positions other than that occupied by said first frame being effective to energize said solenoid means to disengage said latch means and to energize said motor to move said first frame toward said one operative position, said cam and limit switch means being cooperative upon movement of said first frame into said one operative position to de-energize said motor and said solenoid means permitting said latch member to engage said abutment means preventing movement of said first frame out of said one operative position.

2. In an overhead monorail carrier system, a track switch having a first frame, a second frame supporting said first frame for horizontal movement transversely of a trackway at one side of the switch to any of a plurality of operative positions for selectively connecting said trackway with different ones of a plurality of trackways at the other side of the switch, latch means including a retractable latch member supported on one of said frames, abutment means on the other of said frames and releasably engageable by said latch member to prevent movement of said first frame when in said operative positions, said latch means including biasing means resiliently urging said latch member into abutment engaging position, reversible motor means mounted on said second frame and resiliently connected to said first frame for movement thereof between said operative positions, solenoid means connected to said latch means and adapted to retract said latch member when energized from engagement with said abutment means, limit switch means on said first frame, cam means on said second frame for operating said limit switch means, and control means including a control switch corresponding to each of said operative positions, said control means having electrical connection with said solenoid means and with said motor means, the closing of a control switch corresponding to one of said operative positions other than that occupied by said first frame being effective to energize said solenoid means to disengage said latch means and to energize said motor to move said first frame toward said one operative position, said cam and limit switch means being cooperative upon movement of said first frame into said one operative position to deenergize said solenoid means permitting the latter to engage said abutment means preventing movement of said first frame out of said one operative position.

3. An overhead monorail carrier system as defined in claim 2, and wherein said latch member is mounted on said first frame, and said abutment means is mounted on said second frame, said latch member comprising a spring biased plunger, and said abutment means comprising a frame member having openings therein adapted to receive said plunger when said first frame is in said operative positions.

4. An overhead monorail carrier system as defined in claim 2 and wherein said motor is resiliently connected to said first frame by a flexible transmission member and a spring loaded shock absorbing means.

5. In an overhead monorail carrier system, a track switch having a movable frame and a fixed frame, said fixed frame supporting said movable frame for transverse motion with respect to a trackway at one side of the track switch to any of three operative positions for selectively connecting said trackway with different ones of three trackways at the other side of the track switch, latch means including a retractable latch member supported on one of said frames, abutment means on the other of said frames and releasably engageable by said latch member to prevent movement of said movable frame when in said operative positions, reversible motor means mounted on one of said frames and adapted to move said movable frame between said operative positions, solenoid means connected to said latch means and adapted to disengage said latch means when energized, limit switch means mounted on one of said frames and limit switch operating cam means on the other of said frames, and control switch means including a control switch corresponding to each of said three operative positions, said control switch means including electrical connection with said motor means, the closing of the control switch corresponding to one of said three operative positions other than that occupied by said movable frame being effective to energize said solenoid means to disengage said latch means and to energize said motor to move said movable frame toward said one operative position, said cam and limit switch means being cooperative upon movement of said movable frame into said one operative position to de-energize said motor and said solenoid means permitting said latch member to engage said abutment means preventing movement of said movable frame from said one operative position.

6. An overhead monorail carrier system as defined in claim 5 and wherein said latch member is mounted on said movable frame and comprises a spring biased plunger, said abutment means comprises a member mounted on said fixed frame and having three openings therein for receiving said plunger when said movable frame is in said operative positions.

7. An overhead monorail carrier system as defined in claim 5 and wherein said limit switch means comprises first and second limit switches, said cam means comprising four cam surfaces for operatively engaging said limit switches, said switches being on said movable frame and said cam means being on said fixed frame.

8. An overhead monorail carrier system as defined in claim 7 wherein said first and second limit switches are actuated by said cam surfaces to energize said reversible motor in the direction required to move said movable frame to said one operative position and to de-energize said solenoid means and said motor only when said movable frame is substantially in said one operative position.

References Cited in the file of this patent
UNITED STATES PATENTS

| | | |
|---|---|---|
| 1,078,051 | Libby | Nov. 11, 1913 |
| 1,706,211 | Coffey | Mar. 19, 1929 |
| 1,819,017 | Drake | Aug. 18, 1931 |
| 1,917,837 | Haddlessay | July 11, 1933 |
| 2,840,006 | Henderson | June 24, 1958 |
| 2,887,067 | Cotesworth | May 19, 1959 |
| 2,887,068 | Cotesworth | May 19, 1959 |

UNITED STATES PATENT OFFICE

CERTIFICATE OF CORRECTION

Patent No. 2,996,017                          August 15, 1961

Henry A. Gorjanc et al.

It is hereby certified that error appears in the above numbered patent requiring correction and that the said Letters Patent should read as corrected below.

Column 5, line 51, for "mamber" read -- member --; line 57, strike out "side".

Signed and sealed this 2nd day of January 1962.

(SEAL)
Attest:

ERNEST W. SWIDER
Attesting Officer

DAVID L. LADD
Commissioner of Patents